United States Patent
Kato et al.

(10) Patent No.: US 9,901,862 B2
(45) Date of Patent: Feb. 27, 2018

(54) CARBON DIOXIDE RECOVERY SYSTEM AND OPERATING METHOD THEREOF

(71) Applicant: KABUSHIKI KAISHA TOSHIBA, Tokyo (JP)

(72) Inventors: Yasuhiro Kato, Kanagawa (JP); Shinji Murai, Kanagawa (JP); Takehiko Muramatsu, Kanagawa (JP); Satoshi Saito, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 37 days.

(21) Appl. No.: 14/273,035

(22) Filed: May 8, 2014

(65) Prior Publication Data

US 2014/0335003 A1    Nov. 13, 2014

(30) Foreign Application Priority Data

May 9, 2013  (JP) ................. 2013-099568

(51) Int. Cl.
*B01D 53/14* (2006.01)
*B01D 53/62* (2006.01)
*B01D 53/96* (2006.01)

(52) U.S. Cl.
CPC ..... *B01D 53/1475* (2013.01); *B01D 53/1425* (2013.01); *B01D 2252/20436* (2013.01);
(Continued)

(58) Field of Classification Search
CPC .......... B01D 2252/20436; B01D 2252/20447; B01D 2252/20457; B01D 2252/20484;
(Continued)

(56) References Cited

U.S. PATENT DOCUMENTS

| | | | |
|---|---|---|---|
| 2010/0229723 A1* | 9/2010 | Gelowitz | B01D 53/1425 95/162 |
| 2011/0100217 A1 | 5/2011 | Soloveichik et al. | |
| 2011/0232489 A1 | 9/2011 | Holub et al. | |
| 2014/0301929 A1* | 10/2014 | Wang | B01D 53/1425 423/228 |
| 2016/0194210 A1* | 7/2016 | Caton | C01C 3/0212 423/228 |

FOREIGN PATENT DOCUMENTS

| | | |
|---|---|---|
| CN | 101716458 A | 6/2010 |
| CN | 201855648 U | 6/2011 |

(Continued)

OTHER PUBLICATIONS

"Piperazine" by The Merck Index Online, pp. 1-2, Sep. 22, 2016.*
(Continued)

*Primary Examiner* — Cabrena Holecek
(74) *Attorney, Agent, or Firm* — Patterson & Sheridan, LLP

(57) ABSTRACT

A carbon dioxide recovery system includes an absorption tower in which carbon dioxide is absorbed into an absorbing solution then the absorbing solution is output to a regeneration tower in which carbon dioxide is released from the absorbing solution. The regeneration tower outputs the absorbing solution from which carbon dioxide has been released and an exhaust gas included released carbon dioxide and water vapor. In a condensing section the exhaust gas is separated into dioxide gas stream and a condensed water stream. In a mixing section the condensed water is mixed with an amine to a replenishment amine aqueous solution in which the amine is dissolved in the condensed water. In a replenishment section the absorbing solution is mixed with the replenishment amine aqueous solution.

11 Claims, 2 Drawing Sheets

(52) U.S. Cl.
CPC ............ *B01D 2252/20447* (2013.01); *B01D 2252/20457* (2013.01); *B01D 2252/20484* (2013.01); *B01D 2258/0283* (2013.01); *Y02C 10/06* (2013.01)

(58) Field of Classification Search
CPC ........ B01D 2258/0283; B01D 53/1425; B01D 53/1475; Y02C 10/06
See application file for complete search history.

(56) References Cited

FOREIGN PATENT DOCUMENTS

| | | |
|---|---|---|
| CN | 102239231 A | 11/2011 |
| CN | 102553396 A | 7/2012 |
| JP | H08103630 A | 4/1996 |
| JP | 2004323339 A | 11/2004 |
| JP | 2008056642 A | 3/2008 |
| JP | 2008168184 A | 7/2008 |
| JP | 2008307519 A | 12/2008 |
| JP | 2010527774 A | 8/2010 |

OTHER PUBLICATIONS

"1-Propanol,2-amino-2-methyl-(cas 124-68-5) MSDS" by Guidechem, p. 3, Sep. 22, 2016.*
Bing search for the merck index; Sep. 22, 2016.*
Bing search for amp mp; Sep. 22, 2016.*
Chinese Office Action dated Oct. 8, 2015, filed in Chinese counterpart Application No. 201410180739.5, 15 pages (with translation)
Japanese Office Action dated Mar. 28, 2017, filed in Japanese counterpart Application No. 2013-099568, 11 pages (with translation).

* cited by examiner

CARBON DIOXIDE RECOVERY SYSTEM AND OPERATING METHOD THEREOF

CROSS-REFERENCE TO RELATED APPLICATION

This application is based upon and claims the benefit of priority from Japanese Patent Application No. 2013-099568, filed May 9, 2013, the entire contents of which are incorporated herein by reference.

FIELD

Embodiments described herein relate generally to a carbon dioxide recovery system and an operating method thereof.

BACKGROUND

In recent years, global warming caused by greenhouse effect of carbon dioxide ($CO_2$), which is a combustion product of fossil fuels, has become a concern. With this problem in mind, a method of separating and collecting carbon dioxide from combustion exhaust gas by bring the combustion exhaust gas into contact with an amine-based absorbing solution, and a method of storing collected carbon dioxide without discharging carbon dioxide to the atmosphere have been extensively studied for thermal power plants that use a large amount of fossil fuels.

Specifically, a carbon dioxide recovery system including an absorption tower in which carbon dioxide in the combustion exhaust gas is absorbed into an absorbing solution by bringing the combustion exhaust gas into contact with the absorbing solution, and a regeneration tower in which the carbon dioxide is discharged from the absorbing solution by heating the absorbing solution in which the carbon dioxide has been absorbed is known. The absorbing solution after regeneration in the regeneration tower is again circulated to the absorption tower to be reused.

However, when using the amine-based absorbing solution in the system, an amine component is gradually decomposed by heat and oxygen in the combustion exhaust gas. In addition, when the processed combustion exhaust gas is discharged from the absorption tower, a portion of the amine component is lost to the atmosphere along with the combustion exhaust gas. As a result of degradation and loss, the amine component in the absorbing solution is reduced, and thus the performance of the system is reduced. For this reason, in general, it is necessary to periodically perform replenishment of the amines and replacement of the absorbing solution in the system.

As the amines used for the absorbing solution, liquid amines, which are liquid phase at ordinary temperature (hereinafter, referred to as "liquid amines"), and solid amines, which are solid phase at ordinary temperature (hereinafter, referred to as "solid amines"), can be adopted. In this context, "ordinary temperature" means about 20° C. and may also be referred to as "room temperature" or "standard temperature." The liquid amines are generally easier to add to the absorbing solution in the system for purposes of replenishing the absorbing solution. In contrast, since it is typically necessary to stir and/or heat for a long period of time to dissolve the solid amines in water, it is more difficult to replenish the solid amines added in the absorbing solution. Furthermore, since replenishment of solid amine components typically requires that water (used to dissolve the solid amines) also be newly added to the system, there is a concern that the amine concentration in the circulating absorbing solution is reduced, and plant performance will be reduced. For this reason, it is preferable to use high concentration amines for purposes of replenishment or to adjust the amine concentration in the circulating absorbing solution by removing excessive water from the system.

DETAILED DESCRIPTION

Because there is a need to use solid amines as well as liquid amines in carbon dioxide absorbing systems, it is desirable that a method in which liquid amines and solid amines can be easily replenished in a carbon dioxide absorbing solution while not significantly decreasing the amine concentration in a circulating absorbing solution of the system is provided.

Example embodiments provide a carbon dioxide recovery system in which a solid or liquid amine at ordinary temperature can be easily replenished in an absorbing solution without causing an unintended decrease in amine concentration of the circulating absorbing solution in the system, and an operating method of a carbon dioxide recovery system.

In general, according to an example embodiment, a carbon dioxide recovery system includes an absorption tower in which carbon dioxide is absorbed into an absorbing solution. The absorption tower discharges a rich solution that is the absorbing solution into which the carbon dioxide has been absorbed. A regeneration tower receives the rich solution and discharges a lean solution that is the absorbing solution from which carbon dioxide has been released. The lean solution thus has a lower dissolved carbon dioxide concentration than that of the rich solution and is generated by discharging the carbon dioxide and water vapor from the rich solution. A regeneration tower exhaust gas includes the carbon dioxide separated from the rich solution and water vapor. The carbon dioxide recovery system also includes a condensing section that separates the regeneration tower exhaust gas into carbon dioxide-rich stream and a water-rich stream by condensing the water vapor (thereby generating condensed water). A mixing section mixes the condensed water and a replenishment amine to thereby produce a replenishment amine aqueous solution in which the replenishment amine is dissolved. The carbon dioxide recovery system further includes a replenishment section in which the replenishment amine aqueous solution is mixed with (or into) the absorbing solution.

Hereinafter, exemplary embodiments will be described with reference to the drawings.

First Embodiment

Figure 1:
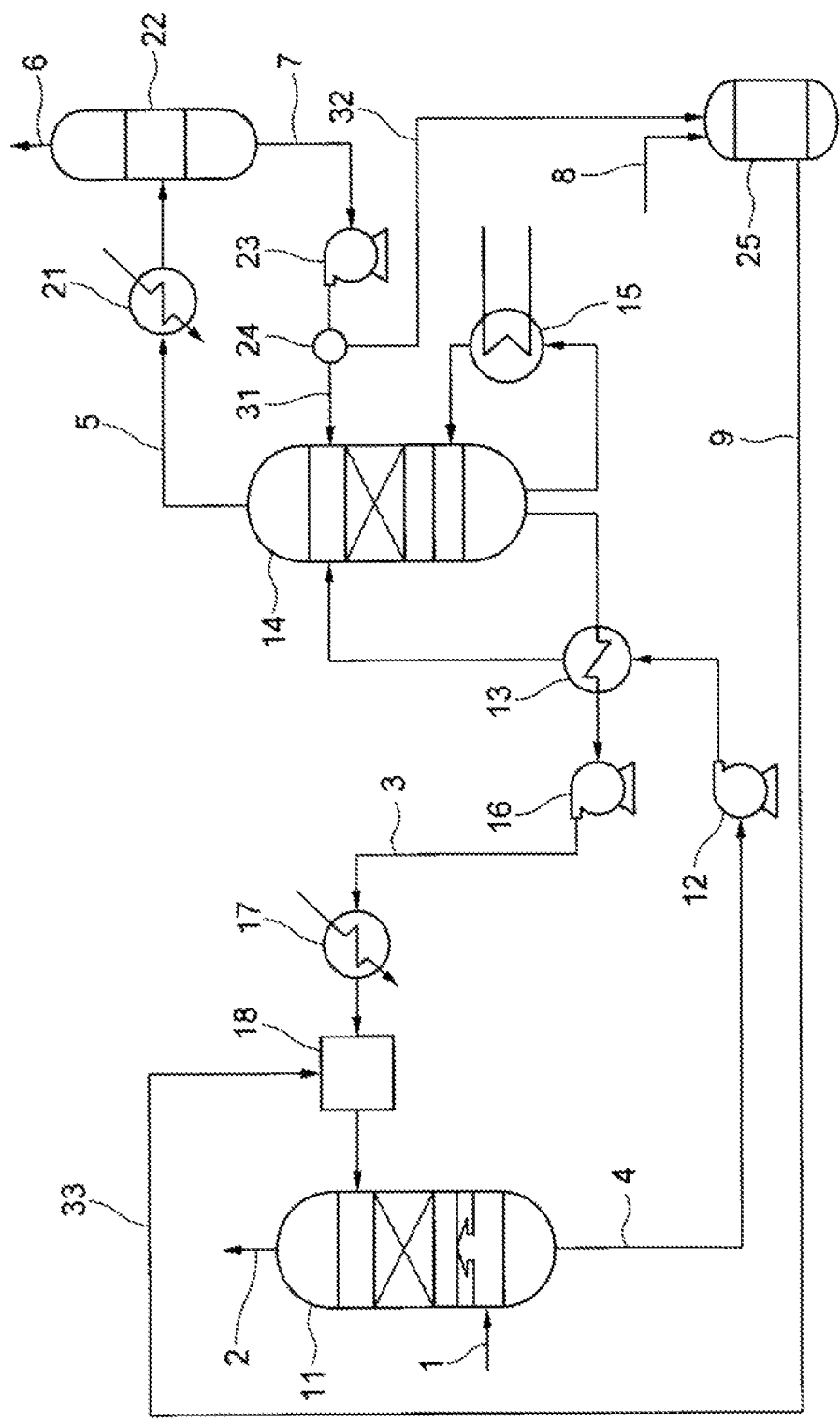
FIG. 1 is a schematic view showing a configuration of a carbon dioxide recovery system according to a first embodiment.

FIG. 1 is a schematic view showing a configuration of a carbon dioxide recovery system according to a first embodiment.

The carbon dioxide recovery system of FIG. 1 is provided with an absorption tower 11, a rich solution pump 12, a regenerative heat exchanger 13, a regeneration tower 14, a reboiler 15, a lean solution pump 16, a lean solution cooler 17, a buffer tank 18, a cooler 21, a condenser 22, a pump 23, a switching valve 24, and a mixer 25.

In the absorption tower 11, absorption tower inlet gas 1 (inlet gas) containing carbon dioxide is brought into contact with an absorbing solution. The carbon dioxide in the inlet gas 1 is absorbed into the absorbing solution fed in this example from buffer tank 18. As an example, combustion exhaust gas generated by thermal power plants and the like may comprise the inlet gas 1. As an example, the absorbing solution may be an amine-based absorbing solution.

An absorption tower exhaust gas 2, which corresponds to the inlet gas 1, gas from which carbon dioxide has been removed, is output from absorption tower 11. A carbon dioxide enriched absorbing solution (hereinafter, referred to as "rich solution") 4 is discharged from the absorption tower 11. The rich solution 4 corresponds to the absorbing solution after contact with the carbon dioxide-rich inlet gas 1.

The rich solution 4 discharged from the absorption tower 11 is provided to the regeneration tower 14 through the regenerative heat exchanger 13 and the rich solution pump 12. Rich solution 4 can be introduced into the top of the regeneration tower 14, from which it then flows down through the regeneration tower 14.

In the reboiler 15, water vapor and carbon dioxide are generated from the absorbing solution initially supplied to regeneration tower 14 (e.g., rich solution 4 supplied to the top of regeneration tower 14)). The water vapor and carbon dioxide are generated by heating the absorbing solution discharged from the bottom of the regeneration tower 14, and these gases (water vapor and carbon dioxide) are returned to the regeneration tower 14 along with the absorbing solution. These gases come into contact with the rich solution 4 flowing down in the regeneration tower 14 while these gases rise up in the regeneration tower 14.

Contact with the heated carbon dioxide and water vapor from the reboiler 15 promotes the discharge of carbon dioxide absorbed in the rich solution 4. A regeneration tower exhaust gas 5 including carbon dioxide and water vapor is output from the regeneration tower 14. A lean absorbing solution (hereinafter, referred to as "lean solution") 3, which corresponds to rich solution 4 from which dissolved/absorbed carbon dioxide has been discharged/removed is also output from the regeneration tower 14. In general, the difference between lean solution 3 and rich solution 4 is that the carbon dioxide concentration is lower in the lean solution 3 than in the rich solution 4.

The lean solution 3 discharged from the regeneration tower 14 is transferred to the buffer tank 18 through the regenerative heat exchanger 13 and the lean solution cooler 17 in series. The buffer tank 18 is a tank used for storing the lean solution 3 to be supplied to the absorption tower 11. Here, lean solution pump 16 is used for transferring the lean solution 3 from the regeneration tower 14 to the buffer tank. From the buffer tank 18, the lean solution 3 is further transferred to the absorption tower 11, where it once again absorbs carbon dioxide from inlet gas 1 and becomes rich solution 4.

Additionally, the rich solution 4 is heated in the regenerative heat exchanger 13, using the heat of the lean solution 3, before input into the regeneration tower 14. The lean solution 3 used in the regenerative heat exchanger 13 is itself in route from the regeneration tower 14 to the absorption tower 11.

In the carbon dioxide recovery system in FIG. 1, the carbon dioxide in inlet gas 1 is separated and collected using a recycling absorbing liquid.

Next, description will be given with regard to treatment of the regeneration tower exhaust gas 5 with reference to FIG. 1.

In cooler 21, the regeneration tower exhaust gas 5 from the regeneration tower 14 is cooled. As a result, the water vapor in the regeneration tower exhaust gas 5 is condensed. The mixed-phase fluid including condensed water and carbon dioxide is supplied to the condenser 22.

In the condenser 22, the mixed-phase fluid is separated into a carbon dioxide stream 6 and a condensed water stream 7. Thus, the carbon dioxide stream 6 is collected from the regeneration tower exhaust gas 5. The cooler 21 and the condenser 22 may be collectively described as components of a condensing section The condensed water stream 7 from the condenser 22 is transferred through the switching valve 24 by pump 23. The switching valve 24 is connected to a line 32 and a line 31, and is used for selectively switching the flow between the lines 31 and 32.

In normal operation, the condensed water stream 7 is returned to the regeneration tower 14 through the line 31. In a case when water content of the absorbing solution becomes excessively large during normal operation, the condensed water stream 7 need not be returned to the regeneration tower 14, but rather can be discharged from the system entirely and/or may be stored for later use.

In a case where amine concentration in the absorbing solution is low, and thus replenishment of the amine is required, the switching valve 24 is switched from the line 31 toward the line 32. As a result, the condensed water stream 7 is introduced into the mixer 25 through the line 32.

In the mixer 25, the water from the condensed water stream 7 and a replenishment amine 8 are mixed, and a replenishment amine aqueous solution 9 in which the replenishment amine 8 is dissolved in the water of condensed water stream 7 is produced. The mixer 25 is a possible example of a mixing section or a component thereof.

In the carbon dioxide recovery system shown in FIG. 1, the replenishment amine aqueous solution 9 discharged from the mixer 25 is mixed with the absorbing solution of the system through a line 33. Specifically, the replenishment amine aqueous solution 9 is mixed with the lean solution 3 in the buffer tank 18. As a result, the replenishment amine 8 is added to the absorbing solution in the system. The line 33 is a possible example of a replenishment section or a component thereof.

In the carbon dioxide recovery system shown in FIG. 1, by such replenishment of amine, the amine concentration in the absorbing solution can be adjusted to or maintained at a predetermined concentration level.

(1) Detailed Description of Replenishment of Amine in the First Embodiment

In the first embodiment, amines which are solid at ordinary temperature (hereinafter, referred to as "solid amines") are used as the replenishment amine 8. Examples of the replenishment amine 8 include piperazine, 2-methylpiperazine, 2,5-dimethylpiperazine, 2,6-dimethylpiperazine, 1,4-diazabicyclo[2.2.2]octane (DABCO), N,N-dimethyl-4-aminopyridine (DMAP), and 2-amino-2-methyl-1-propanol. The replenishment amine 8 may be a mixture including one or more solid amine.

In general, since it is typically necessary to stir or heat for a long period of time to dissolve solid amines in water, it is difficult to replenish solid amines in the absorbing solution.

On the other hand, there is carbon dioxide which remains in the water of the condensed water stream 7 without being separated in the condenser 22. In general, if carbon dioxide is present in the water used as a solvent of an amine, the amine will be ionized by an absorption reaction, and therefore, aqueous solubility of the amine is enhanced.

In the present embodiment, the water in condensed water stream 7 has carbon dioxide still dissolved in it and it is this water that is used as a solvent for the replenishment amine 8. Therefore, it is possible to shorten the stirring time or the heating time for dissolving the replenishment amine 8, and thereby helps to rapidly replenish the amines(s) in the absorbing solution.

In addition, in the first embodiment, the condensed water stream 7 comprises water already present in the system. Thus, replenishment can be effectively made without incorporating additional water as a solvent of the replenishment amine 8. Therefore, according to the first embodiment, the replenishment amine 8 can be added to the system without significantly reducing the amine concentration in the absorbing solution circulating in the system.

Moreover, in general, the amount of carbon dioxide in the water in condensed water stream 7 is at a saturated concentration level. Therefore, according to the present embodiment, by using water in condensed water stream 7 as a solvent, it is possible to further enhance the solubility of the replenishment amine 8 as compared with a case of using a solvent having a lower concentration (e.g., sub-saturation level) of carbon dioxide.

(2) Modified Examples of First Embodiment

Next, description will be given with regard to modified examples of the first embodiment with reference to FIG. 1.

In the first embodiment, the replenishment amine aqueous solution 9 is mixed into the lean solution 3, but the replenishment amine aqueous solution 9 may also be mixed in the rich solution 4. However, when the replenishment amine aqueous solution 9 is mixed into the rich solution 4, the dissolved carbon dioxide concentration in the rich solution 4 is decreased by the replenishment amine aqueous solution 9, and thus regeneration efficiency of the regeneration tower 14 is decreased. Thus, if it is desired to avoid the decrease in the regeneration efficiency, it is preferable that the replenishment amine aqueous solution 9 be mixed in the lean solution 3.

In addition, in the first embodiment, the replenishment amine aqueous solution 9 may be mixed in the lean solution 3 at an arbitrary position other than the buffer tank 18. But when the replenishment amine aqueous solution 9 is mixed with the lean solution 3 in the buffer tank 18 there is a possible advantage in that the amine concentration in the absorbing solution is more easily adjusted.

In the first embodiment, the replenishment amine aqueous solution 9 may also be mixed in the lean solution 3 before passing through the regenerative heat exchanger 13, and the replenishment amine aqueous solution 9 may be mixed with the lean solution 3 after passing through the regenerative heat exchanger 13. However, to more effectively utilize the heat of the lean solution 3 in the regenerative heat exchanger 13, the replenishment amine aqueous solution 9 can be mixed in the lean solution 3 after passing through the regenerative heat exchanger 13.

In addition, the timing for discharging the replenishment amine aqueous solution 9 from the mixer 25 may be any timing as long as the replenishment amine 8 has been dissolved in the water from condensed water stream 7.

In addition, water which is stored in the mixer 25 in advance may be mixed with the replenishment amine 8 when the replenishment of amine is required. However, since the amount of carbon dioxide in the water from condensed water stream 7 decreases with the elapse of time, the water from condensed water stream 7 is preferably stored with consideration of the expected timing of the replenishment of amine mixing process.

In addition, in the mixer 25 of the first embodiment, when producing the replenishment amine aqueous solution 9 by mixing the water from condensed water stream 7 and a solid amine, another amine may be also mixed with the mixture at the same time or in succession. The additional amine may be a solid amine or a liquid amine.

In the first embodiment, it is contemplated that an aqueous solution in which both the liquid amine and the solid amine are dissolved is used as the absorbing solution in some cases. In this case, there is a possibility that only an initially solid amine component but also an initially liquid amine component in the absorbing solution decreases (depletes) over time or with use and must be replenished. In this case, the replenishment amine aqueous solution 9 can be prepared by mixing the water from condensed water stream 7 with both the liquid amine and the solid amine. In this manner, both amines can be replenished in the absorbing solution at the same time. When only the liquid amine component in the absorbing solution is in need of replenishment, only the liquid amine need be replenished using the mixer 25.

As described above, the replenishment amine aqueous solution 9 is produced by mixing the water from condensed water stream 7 and the replenishment amine 8. The absorbing solution is replenished by mixing the replenishment amine aqueous solution 9 into the absorbing solution. Therefore, according to the present embodiment, the solid or liquid amine can be replenished in the absorbing solution without causing a significant decrease in the amine concentration of the absorbing solution circulating in the system.

Second Embodiment

Figure 2:
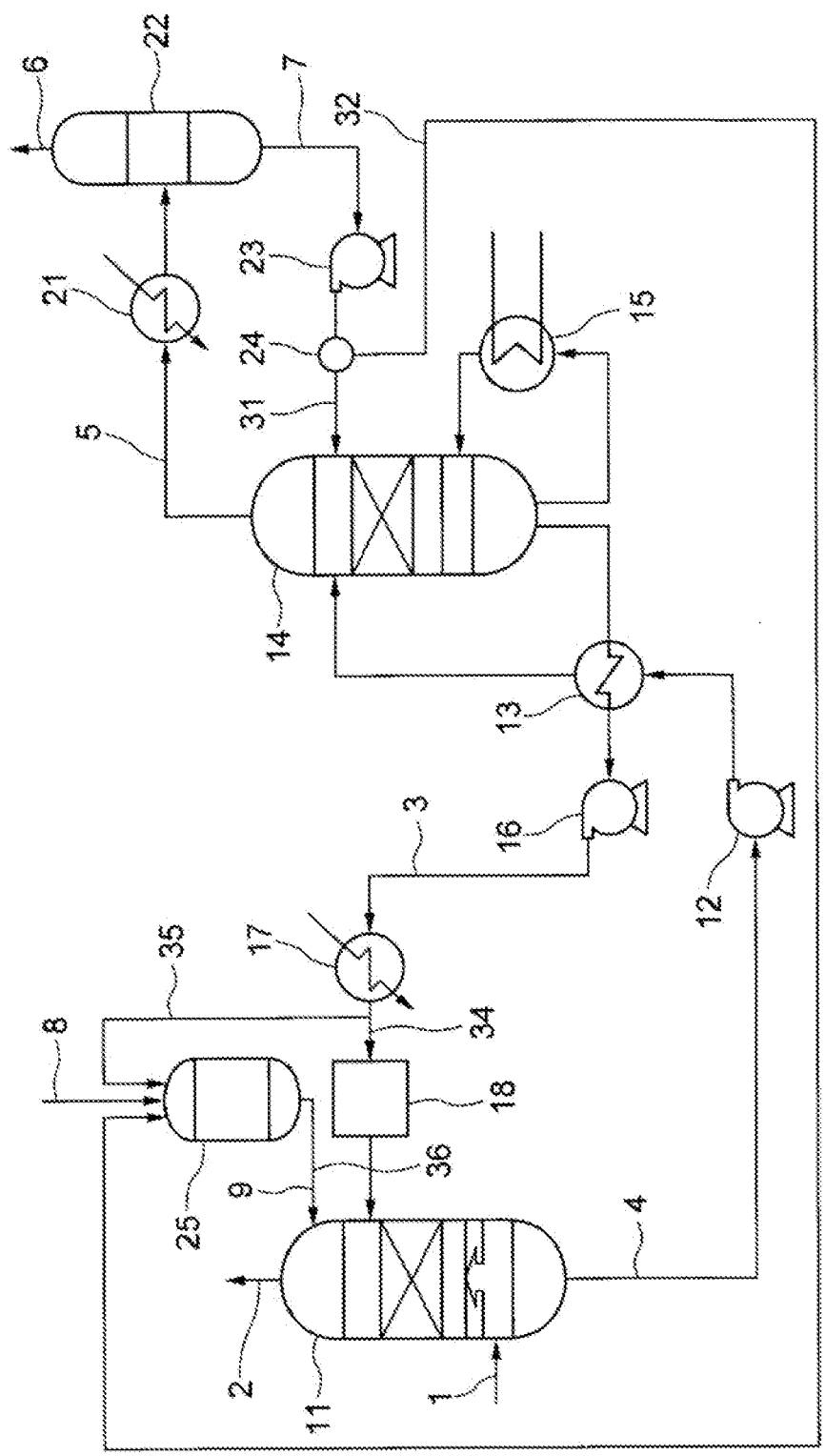
FIG. 2 is a schematic view showing a configuration of a carbon dioxide recovery system according to a second embodiment.

FIG. 2 is a schematic view of a configuration of the carbon dioxide recovery system according to a second embodiment.

In the carbon dioxide recovery system in FIG. 2, lines 34 and 35 for circulating the lean solution 3 after discharge from the lean solution cooler 17 are provided. The line 34 supplies the lean solution 3 to the buffer tank 18, and the line 35 supplies the lean solution 3 to the mixer 25.

In the mixer 25, the replenishment amine aqueous solution 9 is produced by mixing water from condensed water stream 7, the replenishment amine 8, and the lean solution 3. The water from condensed water stream 7, the replenishment amine 8, and the lean solution 3 may be mixed at the same time in the mixer 25, or the mixture and the lean solution 3 may be mixed after the water of condensed water stream 7 and the replenishment amine 8 are mixed with each other. In addition, in the mixer 25 of this example, only a portion of the lean solution 3 discharged from the lean solution cooler 17 need be introduced from the line 35 when producing the replenishment amine aqueous solution 9. It is also contemplated that all of the lean solution 3 discharged from the lean solution cooler 17 may be introduced from the line 35—that is, for some portion of time, all output from lean solution cooler 17 may be directed to mixer 25 to, for example, fill the mixer 25 at a time of replenishment amine 8 addition or dissolution/mixing.

In the carbon dioxide recovery system shown in FIG. 2, the replenishment amine aqueous solution 9 discharged from the mixer 25 is mixed with the absorbing solution circulating in the system through a line 36. Specifically, the replenishment amine aqueous solution 9 is mixed with the absorbing solution (the absorbing solution here may be the lean solution 3 or the rich solution 4, however, the lean solution 3 is typically preferable) in the absorption tower 11. As a result, the replenishment amine 8 is added to the absorbing solution circulating in the system. The line 36 is an example of a replenishment section or a component thereof. As a variation, replenishment amine aqueous solution 9 may be also mixed in the lean solution 3 between the regeneration tower 14 and the absorption tower 11 in the same manner as in the first embodiment.

As another variation, the replenishment amine aqueous solution 9 may be produced by mixing water from condensed water stream 7, the replenishment amine 8, and the rich solution 4 instead of or in addition to lean solution 3. In this embodiment, the lean solution 3 and/or the rich solution 4 used in the mixer 25 of the present embodiment may be obtained from any position in the system. In addition, a valve or valves may be installed on at least one of the line 34, the line 35, and at a junction of the lines 34 and 35.

As described above, in the second embodiment, the replenishment amine aqueous solution 9 is discharged after mixing with the absorbing solution in the mixer 25, and the replenishment amine 8 is replenished in the circulating absorbing solution by mixing the replenishment amine aqueous solution 9 with the absorbing solution. Therefore, it is possible to prevent or mitigate any abrupt change in the amine concentration of the absorbing solution that might be caused by mixing in the replenishment amine aqueous solution 9 into the circulating absorbing solution. Therefore, operation of the system while maintaining a constant gas-liquid or thermal balance is easily performed.

EXAMPLES AND COMPARATIVE EXAMPLES

Hereinafter, in order to more fully describe the first and the second embodiments, description will be given with regard to the examples in which tests have been performed by reproducing the characteristics of a solvent (water) under conditions corresponding to the water from condensed water 7 stream, and the comparative examples thereof.

Example 1

A gas of which a content of $CO_2$ is 99% is blown into 100 ml of water at a gas flow rate of 100 ml/min at 20° C., and after confirming that a flow rate of an outlet gas becomes equivalent to a flow rate of the inlet gas, 10 g of piperazine was added to water, and the resultant was stirred with a stirrer at 20° C. until the piperazine was dissolved. The piperazine was completely dissolved in 10 minutes under these conditions.

Example 2

A test was carried out in the same manner as in Example 1 except that 15 g of piperazine was used. The piperazine was completely dissolved in 15 minutes under these conditions.

Example 3

Test was carried out in the same manner as in Example 1 except that 45 g of DABCO was used. The DABCO was completely dissolved in 10 minutes under these conditions.

Example 4

Test was carried out in the same manner as in Example 1 except that 10 g of DMAP was used. The DMAP was completely dissolved in 5 minutes under these conditions.

Example 5

In Example 5, water from the condensed water stream 7 from the system in FIG. 1 was used as the solvent. Specifically, after initially cooling the system to 25° C., 100 ml of the condensed water was taken out and further cooled to 20° C. 10 g of piperazine was then added to the condensed water, and the resultant was stirred with a stirrer at 20° C. until the piperazine was dissolved. The piperazine was completely dissolved in 10 minutes under these conditions.

Comparative Example 1

10 g of piperazine was added to 100 ml of water at 20° C., and the resultant was stirred with a stirrer until the piperazine was dissolved. The piperazine was completely dissolved in 15 minutes under these conditions.

Comparative Example 2

A test was carried out in the same manner as in Comparative example 1 except that 15 g of piperazine was used. The piperazine was completely dissolved in 20 minutes under these conditions.

Comparative Example 3

A test was carried out in the same manner as in Comparative example 1 except that 45 g of DABCO was used. The DABCO was completely dissolved in 20 minutes under these conditions.

Comparative Example 4

A test was carried out in the same manner as in Comparative example 1 except that 10 g of DMAP was used. The DMAP was completely dissolved in 10 minutes under these conditions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A carbon dioxide recovery system, comprising:
an absorption tower in which an amine-based absorbing solution absorbs carbon dioxide, the absorption tower configured to output the amine-based absorbing solution which has absorbed carbon dioxide;
a regeneration tower in which the amine-based absorbing solution output from the absorption tower releases carbon dioxide, the regeneration tower configured to output the amine-based absorbing solution, from which carbon dioxide has been released, and a regeneration tower exhaust gas, which includes carbon dioxide and water vapor;

a regenerative heat exchanger configured to heat the amine-based absorbing solution output from the absorption tower, the regenerative heat exchanger configured to transfer heat from the amine-based absorbing solution output from the regeneration tower to the amine-based absorbing solution output from the absorption tower;

a condenser configured to condense the water vapor in the regeneration tower exhaust gas and to output a gas stream and a condensed water stream;

a mixer configured to mix the condensed water stream with a replenishment amine from outside the carbon dioxide recovery system to produce a replenishment amine aqueous solution; and a replenishment amine aqueous solution supply line configured to supply the replenishment amine aqueous solution from the mixer to the absorption tower, wherein the replenishment amine aqueous solution supply line is configured to mix the replenishment amine aqueous solution with the amine-based absorbing solution output from the regenerative heat exchanger.

2. The carbon dioxide recovery system according to claim 1, wherein the replenishment amine aqueous solution is produced by mixing the condensed water stream, the replenishment amine, and the amine-based absorbing solution in the mixer.

3. The carbon dioxide recovery system according to claim 1, wherein the replenishment amine is solid at 20° C.

4. The carbon dioxide recovery system according to claim 1, further comprising:

an absorbing solution supply line configured to supply at least a part of the amine-based absorbing solution output from the regeneration tower to the mixer.

5. The carbon dioxide recovery system according to claim 1, wherein the replenishment amine includes at least one of piperazine, 2-methylpiperazine, 2,5-dimethylpiperazine, 2,6-dimethylpiperazine, 1,4-diazabicyclo[2.2.2]octane, N,N-dimethyl-4-aminopyridine, and 2-amino-2-methyl-1-propanol.

6. The carbon dioxide recovery system according to claim 5, wherein the replenishment amine aqueous solution is produced by mixing the condensed water stream, the replenishment amine, and the amine-based absorbing solution in the mixer.

7. A carbon dioxide recovery system, comprising:

an absorption tower in which an amine-based absorbing solution absorbs carbon dioxide, the absorption tower configured to output the amine-based absorbing solution which has absorbed carbon dioxide;

a regeneration tower in which the amine-based absorbing solution output from the absorption tower releases carbon dioxide, the regeneration tower configured to output the amine-based absorbing solution, from which carbon dioxide has been released, and a regeneration tower exhaust gas, which includes carbon dioxide and water vapor;

a condenser configured to condense the water vapor in the regeneration tower exhaust gas and to output a gas stream and a condensed water stream;

a mixer configured to mix the condensed water stream with a replenishment amine from outside the carbon dioxide recovery system to produce a replenishment amine aqueous solution;

a replenishment amine aqueous solution supply line configured to supply the replenishment amine aqueous solution from the mixer to the absorption tower; and a buffer tank configured to store the amine-based absorbing solution output from the regeneration tower and to output the amine-based absorbing solution mixed with the replenishment amine aqueous solution to the absorption tower.

8. The carbon dioxide recovery system according to claim 7, wherein the replenishment amine is solid at 20° C.

9. The carbon dioxide recovery system according to claim 7, wherein the replenishment amine includes at least one of piperazine, 2-methylpiperazine, 2,5-dimethylpiperazine, 2,6-dimethylpiperazine, 1,4-diazabicyclo[2.2.2]octane, N,N-dimethyl-4-aminopyridine, and 2-amino-2-methyl-1-propanol.

10. The carbon dioxide recovery system according to claim 7, wherein the amine-based absorbing solution mixed with the replenishment amine aqueous solution is amine-based absorbing solution having a first concentration level of carbon dioxide that is less than a second concentration level of carbon dioxide in the amine-based absorbing solution output from the absorption tower.

11. The carbon dioxide recovery system according to claim 7, wherein the mixer is configured to mix the amine-based absorbing solution with the condensed water stream and the replenishment amine to produce the aqueous amine solution.

* * * * *